United States Patent [19]

Kitaike et al.

[11] Patent Number: 5,563,227
[45] Date of Patent: Oct. 8, 1996

[54] MAT THERMOPLASTIC RESIN COMPOSITION AND LAMINATE THEREFROM, MATTING AGENT THEREFOR, AND METHOD FOR MATTING THERMOPLASTIC RESIN

[75] Inventors: Yukio Kitaike; Hiroki Hatakeyama; Suehiro Tayama, all of Otake; Kazuhiko Nakagawa, Toyohashi, all of Japan

[73] Assignee: Mitsubishi Rayon Company Ltd., Tokyo, Japan

[21] Appl. No.: 471,412

[22] Filed: Jun. 6, 1995

Related U.S. Application Data

[62] Division of Ser. No. 250,614, May 27, 1994.

[30] Foreign Application Priority Data

| May 28, 1993 | [JP] | Japan | 5-127069 |
| Oct. 7, 1993 | [JP] | Japan | 5-251969 |
| Jan. 10, 1994 | [JP] | Japan | 6-992 |
| Jan. 14, 1994 | [JP] | Japan | 6-2632 |

[51] Int. Cl.⁶ .................. C08F 220/18; C08F 220/28; C08F 216/04
[52] U.S. Cl. .................. 526/320; 428/402; 526/261
[58] Field of Search ................ 526/320, 261; 428/402

[56] References Cited

U.S. PATENT DOCUMENTS

| 3,304,280 | 2/1967 | Senior | 526/320 |
| 4,501,868 | 2/1985 | Bouboulis | 526/320 |
| 4,849,480 | 7/1989 | Antonelli | 525/303 |
| 5,120,795 | 6/1992 | Filges et al. | |
| 5,288,828 | 2/1994 | Harris | 526/320 |

FOREIGN PATENT DOCUMENTS

| 28333 | 8/1973 | Japan | 525/223 |
| 4-149288 | 5/1992 | Japan . | |

OTHER PUBLICATIONS

Abstract, 4–149288 (A) Translation for Japan 4–149288.

Primary Examiner—David Buttner
Attorney, Agent, or Firm—Oblon, Spivak, McClelland, Maier & Neustadt, P.C.

[57] ABSTRACT

Disclosed is a technology for providing a thermoplastic resin composition or resin laminate having an excellent mat property by using, as matting agent, a copolymer (B) prepared by polymerizing 0.5 to 80% by weight of a hydroxyalkyl (meth)acrylate having a $C_{1-8}$ alkyl group and 10 to 99% by weight of an alkyl methacrylate having a $C_{1-13}$ alkyl group, with a $C_{1-8}$ alkyl acrylate, vinyl aromatic monomer, another vinyl monomer, and a cross-linking monomer being optional.

8 Claims, No Drawings

MAT THERMOPLASTIC RESIN COMPOSITION AND LAMINATE THEREFROM, MATTING AGENT THEREFOR, AND METHOD FOR MATTING THERMOPLASTIC RESIN

This is a division, of application Ser. No. 08/250,614 filed on May 27, 1994.

BACKGROUND OF THE INVENTION

1. Field of the Invention

The present invention relates to a thermoplastic resin composition and a thermoplastic resin laminate, each having an excellent mat property. Further, the present invention relates to a matting agent for thermoplastic resins. Still further, the present invention relates to a method for matting thermoplastic resins.

2. Description of the Related Art

The term "acrylic resin" as used hereinafter is intended to have the meaning of both acrylic resin and methacrylic resin.

Molded products of a thermoplastic resin such as an acrylic resin, polyvinyl chloride resin, and ABS resin generally have gloss or luster which has been understood to be an important characteristic for certain applications. On the other hand, there are many applications in which the gloss is not required, or glossless or mat products are preferred.

Conventional methods for matting a thermoplastic resin are divided roughly into method (1) in which an embossing or mat finish is applied, and method (2) in which an inorganic or organic matting agent is added. Method (1) is inferior in productivity and processing expense, and insufficient in the mat effect; thus this method is unsuitable in many instances for the applications where a fabrication of a resin is required to be conducted, while it is advantageous in that the deterioration in the physical properties of the resin is generally small. In contrast, method (2) involves a big problem of deteriorating the physical properties, while it is advantageous in that the decrease in productivity is small, the extent of the mat finish can be controlled, and this method can be used even for applications where fabrication is conducted. In particular, when an inorganic material such as a silica gel is used as a matting agent, the resin will deteriorate considerably in impact resistance, tensile strength and elongation.

On the other hand, another method is disclosed in Unexamined Japanese Patent Publication No. 56-36535 in which an organic material, particularly, a high polymeric matting agent is used. Specifically, a cross-linked polymer prepared by a suspension polymerization and having an average particle diameter of 35 to 500 µm is used in this publication. However, the method using the high polymeric matting agent mentioned above produced insufficient matting effect while the deterioration of impact resistance, and tensile strength and elongation was small.

SUMMARY OF THE INVENTION

Accordingly, an object of the present invention is to solve the problems explained above, and to provide a thermoplastic resin product having an excellent mat property. Other objects will be apparent to those skilled in the art from the following description.

As a result of the research by the present inventors, it has been found that an excellent matting effect can be developed on a thermoplastic resin by blending a copolymer (B) comprising an acrylic acid hydroxyalkyl ester and/or methacrylic acid hydroxyalkyl ester unit to the thermoplastic resin.

An aspect of the present invention relates to a thermoplastic resin composition (I) having an excellent mat property, comprising a blend of 100 parts by weight of a thermoplastic resin (A) with 0.1 to 40 parts by weight of a copolymer (B) prepared by polymerizing a monomer mixture (B-1) comprising 0.5 to 80% by weight of an acrylic acid hydroxyalkyl ester and/or methacrylic acid hydroxyalkyl ester having an alkyl group of 1 to carbon atoms (b-1), 10 to 99% by weight of a methacrylic acid alkyl ester having an alkyl group of 1 to 13 carbon atoms (b-2), 0 to 79% by weight of an acrylic acid alkyl ester having an alkyl group of 1 to 8 carbon atoms (b-3), 0 to 70% by weight of a vinyl aromatic monomer (b-4), and 0 to 20% by weight of another monoethylenically unsaturated monomer (b-5) and 0 to 5 parts by weight, per 100 parts by weight of the monomer mixture (B-1), of a copolymerizable cross-linking monomer having 2 or more double bonds in its molecule (B-2).

Another aspect of the present invention relates to a thermoplastic resin laminate having an excellent mat property comprising a substrate thermoplastic resin (E) and the thermoplastic resin composition (I), formed on the surface of the substrate resin (E), comprising a blend of 100 parts by weight of the thermoplastic resin (A) and 0.1 to 40 parts by weight of the copolymer (B) mentioned above.

A further aspect of the present invention relates to a matting agent comprising the copolymer (B) mentioned above.

A still further aspect of the present invention relates to a method for matting a thermoplastic resin (A) comprising blending 0.1 to 40 parts by weight of the copolymer (B) mentioned above to 100 parts by weight of the thermoplastic resin (A).

DESCRIPTION OF THE PREFERRED EMBODIMENTS

As the thermoplastic resin (A) used in the present invention, any type of conventional thermoplastic resin can be used. However, an acrylic resin, polyvinyl chloride resin, and ABS resin are preferred, among which acrylic resin is most desirable.

Next, the monomers to be used for the copolymer (B) are described.

The acrylic acid hydroxyalkyl ester and/or methacrylic acid hydroxyalkyl ester include 2-hydroxyethyl methacrylate, 2-hydroxypropyl methacrylate, 2,3-dihydroxypropyl methacrylate, 2-hydroxyethyl acrylate, and 4-hydroxybutyl acrylate, among which 2-hydroxyethyl methacrylate is preferable in particular.

The amount of the acrylic acid hydroxyalkyl ester and/or methacrylic acid hydroxyalkyl ester to be used is in a range of 0.5 to 80% by weight. When a cross-linking monomer is not used, addition of the ester in an amount of less than 1% by weight will be insufficient for developing mat effect. On the other hand, when the cross-linking monomer is used, addition of less than 0.5% by weight is insufficient for mat effect. When the cross-linking monomer is not used and the amount of the ester exceeds 80% by weight, the surface conditions of a final resin sometimes become poor. When the cross-linking agent is used, the surface conditions of a final resin may become poor if the hydroxyalkyl ester is used in an amount of not less than 50%. Thus, when the cross-linking monomer is not used, the amount of the ester to be used is preferably in a range of 5 to 50% by weight to develop a mat property. On the other hand, when the cross-linking monomer is used, it is preferably used in a range of 1 to 40% by weight to develop a favorable mat property.

As the methacrylic acid ester, lower methacrylic acid esters such as methyl methacrylate, ethyl methacrylate, and butyl methacrylate are preferable, among which methyl methacrylate is preferable in particular. The amount of the methacrylic acid ester to be used is required to be in a range of 10 to 99% by weight. Further, when the cross-linking monomer is preferably not used, the methacrylate is desirably used in a range of 30 to 85% by weight. On the other hand, when the cross-linking monomer is used, the methacrylate is desirably used in a range of 15 to 70% by weight.

The acrylic acid alkyl ester can be used in a range of up to 79% by weight, and preferably used in a range of 0.5 to 40% by weight, more preferably 5 to 25% by weight. The acrylate is preferably a lower acrylic acid alkyl ester such as methyl acrylate, ethyl acrylate, butyl acrylate, and 2-ethylhexyl acrylate.

The aromatic vinyl monomer can be used in a range up to 70% by weight. When the cross-linking monomer is not used, the aromatic vinyl monomer is preferably used in a range of 0 to 40% by weight, more preferably 0 to 20% by weight. On the other hand, when the cross-linking monomer is used, it is preferably used in a range of 10 to 60% by weight, more preferably 15 to 55% by weight. The aromatic vinyl monomer includes styrene, vinyl toluene, α-methyl styrene, and halogenated styrene, among which styrene is preferable.

Further, another monoethylnically unsaturated monomer may be used in a range up to 20% by weight, preferably 0 to 10% by weight for the copolymer (B) in the present invention. Specifically, a known monomer can be used as the unsaturated monomer, and it includes, for example, methacrylic acid, fumaric acid, maleic acid, and a copolymerizable carboxylic acid and their esters (except methacrylic acid alkyl esters having 1 to 13 carbon atoms in the alkyl group and acrylic acid alkyl esters having 1 to 8 carbon atoms in the alkyl group), vinyl halide such as vinyl chloride and vinyl bromide, vinyl ester such as vinyl acetate, and acrylonitrile.

As the cross-linking monomer (b-2), a compound having 2 or more unsaturated bonds is used. Specifically, it includes allyl group containing cross-linking monomers such as allyl methacrylate, triallyl cyanurate, and triallyl isocyanurate, unsaturated carboxylic acid of alkylene glycol such as ethylene glycol dimethacrylate, unsaturated alcohol ether of alkylene glycol such as propylene glycol diallyl ether, and polyvalent benzene such as divinyl benzene, among which allyl methacrylate is preferable.

It is preferably a compound having at least two unsaturated bonds at least one of which is allyl group in particular. By using the cross-linking monomer containing an allyl group mentioned above, it becomes possible to produce a proper density distribution of the cross-linking within the copolymer (B).

The amount of the cross-linking monomer to be added is 0 to 5 parts by weight per 100 parts by weight of non-cross-linking monomer. From the viewpoint of developing a mat property, it is preferable to use a cross-linking monomer. However, the mat property can be sufficiently produced even when the cross-linking monomer is not used. Conversely, when more than 5% by weight of the cross-linking monomer is used, the surface conditions of final polymers become poor.

The method for preparing the copolymer (B) is not specifically limited, and a suspension polymerization method is preferable.

As an initiator for the suspension polymerization, one used in conventional suspension polymerizations can be used, including an organic peroxide and azo compound.

As a suspension stabilizer, a conventional one can be used, including an organic colloidal high-molecular material, inorganic colloidal high-molecular material, inorganic fine particle or a combination of such a material with a surfactant.

A polymerization regulator such as a mercaptan may be used, and in many cases it is rather preferable to use the regulator to control the molecular weight distribution.

The suspension polymerization is usually carried out by forming an aqueous suspension of monomers together with the polymerization initiator in the presence of a suspension stabilizer. Further, it can also be carried out by using a polymer which is soluble in a monomer, after having dissolved the polymer in the monomer, or by first partially conducting a bulk polymerization without adding the cross-linking monomer and then conducting a suspension polymerization after the addition of the both cross-linking monomer and suspension stabilizer.

When the cross-linking monomer is used, the polymer particles to be obtained will have a diameter of 5 to 500 μm, and preferably 40 to 250 μm to develop the best effect. When the average particle diameter is smaller than 5 μm, the mat property is not sufficient. Conversely, when it exceeds 500 μm, the surface of the molded products to be obtained becomes coarse and a uniform mat effect can hardly be obtained.

The amount of the copolymer (B) thus obtained and to be blended is in a range of 0.1 to 40 parts by weight, preferably 1 to 20 parts by weight per 100 parts by weight of the thermoplastic resin (A). In order to obtain an excellent mat property, the copolymer (B) is preferably used in an amount of more than 2.0 parts by weight when the cross-linking monomer is not used. When the cross-linking monomer is used, it is preferably used in an amount of more than 1.0 part by weight from the viewpoint of mat effect.

Among many kinds of acrylic resins, the acrylic polymers having a multi-layered structure (C) and acrylic copolymers (D) defined below are particularly excellent in the development of mat property.

The structure of, and the monomers used for preparing the acrylic polymers having a multi-layered structure (hereinafter abbreviated to a multi-layered polymer according to the context) (C) are explained below:

The acrylic acid alkyl ester having an alkyl group of 1 to 8 carbon atoms from which ester the innermost polymer (C-a) is formed includes methyl acrylate, ethyl acrylate, propyl acrylate, butyl acrylate, 2-ethylhexyl acrylate, and n-octyl acrylate. These acrylates may be used alone or in combination, and the ester having a low Tg is preferable. The methacrylic acid alkyl ester having an alkyl group of 1 to 4 carbon atoms which ester is also used for preparing the innermost polymer (C-a) includes methyl methacrylate, ethyl methacrylate, propyl methacrylate, and butyl methacrylate. These methacrylates may be used alone or in combination. These acrylic or methacrylic acid alkyl esters (c-a1) are used in a range of 80 to 100% by weight. While the same acrylic or methacrylic ester is most desirably used consistently even in succeeding polymerization stages, a different kind, or 2 or more kinds of the esters can be used in succeeding stages according to the end uses.

As the copolymerizable monomer having a double bond (c-a2), an acrylic or methacrylic monomer such as an acrylic acid higher alkyl ester, acrylic acid lower alkoxy ester, acrylic acid cyanoethyl ester, acrylamide, acrylic acid, and methacrylic acid is preferable, and they are used in a range of 0 to 20% by weight. Styrene, alkyl-substituted styrene, acrylonitril, or methacrylonitrile may be used in a range not exceeding 20% by weight in the component (C-a).

The polyfunctional monomer (c-a3) is preferably a dimethacrylic acid alkylene glycol ester such as ethylene glycol dimethacrylate, 1,3-butylene glycol dimethacrylate, 1,4-butylene glycol dimethacrylate, and propylene glycol dimethacrylate, and a polyvinyl benzene such as divinyl benzene and trivinyl benzene, and a diacrylic acid alkylene glycol ester can also be used. These monomers effectively act to form cross-links within the layer in which the monomer is included, but do not act to form bonds between one layer and another layer. Even when the polyfunctional monomer (c-a3) is not used at all, a polymer having a stable multilayered structure can be prepared so far as a graft-linking agent exists in the component (C-a). However, the polyfunctional monomer may be optionally used according to the situation, for instance, in such a case where a high hot strength is strictly required, and the amount to be used is in a range of 0 to 10% by weight.

The graft-linking agent includes allyl, methallyl, or crotyl ester of $\alpha,\beta$-unsaturated carboxylic acid or dicarboxylic acid, and allyl ester of acrylic acid, methacrylic acid, maleic acid, or fumaric acid is preferably mentioned. Particularly, allyl methacrylate has an excellent effect. Besides, triallyl cyanurate and triallyl isocyanurate are also effective. In these graft-linking agents, the conjugated unsaturated bonds in the ester mainly react much more quickly than the allyl, methallyl, or crotyl group to chemically bonds. On the other hand, considerable portions of the allyl, methallyl, or crotyl group effectively act during the polymerization for the polymer of a succeeding layer to produce graft-linkings between adjacent layers.

The amount of the graft-linking agent to be used is critically important, and it is in a range of 0.1 to 5 parts by weight, preferably 0.5 to 2 parts by weight, per 100 parts by weight of the total amount of the components (c-al) to (c-a3) mentioned above. When the amount is less than 0.1 part by weight, the effective amount of graft-linking becomes-small. Conversely, when the amount exceeds 5 parts by weight, the amount of reaction with a cross-linked elastic polymer formed by the polymerization at the second stage becomes large, and thus causes the lowering of the elasticity of cross-linked rubber having a two-layered elastomeric structure, which is a characteristic of the present invention.

The content of the innermost polymer (C-a) in the multi-layered polymer (C) in the present invention is 5 to 35% by weight, preferably 5 to 15% by weight, and it is desirably smaller than the content of the cross-linked elastic polymer (C-b).

The cross-linked elastomer (C-b) which constitutes a part of the multi-layered polymer (C) is a principal component to provide the polymer (C) with rubber elasticity. For the components (c-b1) to (c-b3) and graft-linking agent which constitute the cross-liked elastomer (C-b), the same monomers as those used for a polymer of the innermost layer can be used, respectively. The component (c-b1) is used in a range of 80 to 100% by weight, component (c-b2) is 0 to 20% by weight, component (c-b3) is 0 to 10% by weight, and the graft-linking agent is used in a range of 0.1 to 5 parts by weight, per 100 parts by weight of the total amount of the components (c-b1) to (c-b3).

The content of the cross-linked elastic polymer (C-b) in the multi-layered polymer (C) in the present invention is preferably in a range of 10 to 45% by weight, and it is desirably higher than the content of the polymer of the innermost layer (C-a).

Further, in order to obtain a final polymer having an excellent solvent resistance and water-whitening resistance, it is necessary that the 2-layered cross-linked rubber elastomer is designed to have a gel content greater than 85% and a swelling degree in a range of 3 to 13 determined by the methods described below:

[Methods for determining the gel content and swelling degree]

A prescribed amount of a 2-layered cross-linked rubber elastic polymer is sampled according to the method specified in JIS K-6388, immersed in methyl ethyl ketone (hereinafter referred to as MEK) at 25° C. for 48 hours to swell, and taken out of MEK. The MEK adhered to the sample polymer is wiped off and the polymer is weighed. Then the polymer is dried in a vacuum dryer to evaporate off the MEK, the absolute dry weight of the polymer is noted after the polymer reached a constant weight, and the swelling degree and gel content are calculated by the following equations:

Swelling degree (%) =

[(Weight of polymer after swollen with *MEK* −

Absolute dry weight of polymer)/

Absolute dyr weight of polymer] × 100

Gel content (%) =

(Absolute dry weight of polymer/ weight of sampled polymer) × 100

The polymer of the outermost layer (C-c) which constitutes a part of the multi-layered polymer (C) in the present invention is to give a required moldability and mechanical properties to the multilayered polymer (C). As the components (c-c1) and (c-c2) which constitute the polymer of the outermost layer (C-c), the same monomers as those used for the components (c-a1) and (c-a2) can be used. The components (c-c1) and (c-c2) are used in a range of 51 to 100% by weight and 0 to 49% by weight, respectively. In order to obtain a final polymer having an excellent solvent and water-whitening resistance, it is necessary that the polymer of the outermost layer (C-c) itself have a Tg higher than 60° C. and preferably higher than 80° C. When the polymer (C-c) has a Tg of lower than 60° C., a final polymer having an excellent solvent resistance and water-whitening resistance cannot be produced even if the gel content of the final polymer is higher than 50%.

The content of the polymer of the outermost layer (C-c) in the multi-layered polymer (C) in the present invention is 10 to 80% by weight and preferably 40 to 60% by weight.

The multi-layered polymer (C) contains the polymer of the innermost layer (C-a), cross-linked elastic polymer (C-b), and polymer of the outermost layer (C-c) as its basic structure, and further contains at least one intermediate layer (C-d) prepared from 10 to 90% by weight of an acrylic acid alkyl ester having an alkyl group of 1 to 8 carbon atoms (c-d1), 90 to 10% by weight of a methacrylic acid alkyl ester having an alkyl group of 1 to 4 carbon atoms (c-d2), 0 to 20% by weight of a copolymerizable monomer having a double bond (c-d3), 0 to 10% by weight of a polyfunctional monomer (c-d4), and 0.1 to 5 parts by weight, per 100 parts by weight of the total amount of the monomers (c-d1) to (c-d4), of a graft-linking agent, between the layer of the cross-linked elastic polymer (C-b) and the polymer of the outermost layer (C-c) in such a way that the amount of the acrylic acid alkyl esters in the polymers are decreased from the cross-linked elastic polymer (C-b) toward the polymer of the outermost layer (C-c), preferably steadily. For the components (c-d1) to (c-d4) and graft-linking monomer, about the same monomers as those used for the polymer of the innermost layer (C-a) can be used. The graft-linking agent used for the intermediate layer is necessary to closely bond adjacent polymer layers to each other and to obtain excellent properties of a final polymer.

The content of the intermediate layer (C-d) in the multi-layered polymer (C) in the present invention is 5 to 35% by weight. When the content is less than 5% by weight, the function as intermediate layer will be lost, and when it exceeds 35% by weight, a favorable balance in the properties of a final polymer will be lost.

The multi-layered polymer (C) in the present invention is comprised of the layers of polymer (C-a), (C-b), (C-c), and (C-d). In order to develop an excellent mat property to a thermoplastic resin composition comprising the multi-layered polymer (C) and a copolymer (B) having a hydroxyl group, it is preferable that the gel content of the multi-layered polymer (C) be higher than 50%. Further, in order that the multi-layered polymer (C) have an excellent solvent resistance and water-whitening resistance, the gel content of the polymer is required to be higher than 50%, preferably higher than 60%. In this instance, the term "gel content" means the total content of the 2-layered cross-linked elastomer itself, intermediate layer (C-d), and the graft component in the polymer of the outermost layer (C-c) to the cross-liked rubber elastomer. Specifically, the term "gel content" indicates the weight percent of insoluble components determined after 1% by weight of a solution of the multi-layered polymer in MEK was prepared, allowed to stand for a day and night, and subjected to centrifugation at 16,000 r.p.m. for 90 min. The component is an added weight of the 2-layered cross-linked rubber elastomer and grafted layer, while this can be substituted by graft ratio, the term "gel content" is used as a standard for graft amount in the present invention since the polymer has a specific structure.

When a polymer emulsion is subjected to a salting out in the present invention, it is important and one of the characteristics that the amount of residual metal in the final product is controlled to less than 500 ppm. Attention should be paid to this fact in the practice of the present invention.

While the method for preparing the multi-layered polymer (C) is not specifically limited, a method of multi-stage polymerization by emulsion polymerization technique is most suitable, and the multi-layered polymer (C) can be prepared, for instance, by an emulsion-suspension polymerization wherein the polymerization system is converted to a suspension system at the time of polymerization for a polymer of the outermost layer (C-c), after emulsion polymerization for preceeding stages.

Next, the composition of, and method for preparing an acrylic polymer (D) are illustrated.

The acrylic polymer (D) comprises 0.1 to 20% by weight of a thermoplastic resin (D-1), 5 to 80% by weight of a rubber-containing polymer (D-2), and 0 to 93.9% by weight of another thermoplastic polymer (D-3), the total amount being 100% by weight, and the polymers (D-1) to (D-3) will be illustrated in more detail hereinafter.

The thermoplastic polymer (D-1) in the acrylic polymer (D) is prepared from polymerization of 50 to 100% by weight of methyl methacrylate and 0 to 50% by weight of at least one other copolymerizable vinyl monomer, and has a reduced viscosity (determined by dissolving 0.1 g of polymer in 100 ml of chloroform and at 25° C.) of higher than 0.1 L/g. The polymer (D-i) plays an important role to the moldability of the polymer to a film. When the reduced viscosity of the polymer is lower than 0.1 L/g, a film of good thickness accuracy cannot be produced. The reduced viscosity usually exceeds 0.1L/g but is lower than 2 L/g, and preferably 0.2 to 1.2 L/g.

In the thermoplastic polymer (D-1), an acrylic acid alkyl ester, methacrylic acid alkyl ester, vinyl aromatic compound, and vinyl cyanide can be used as the vinyl monomer copolymerizable with methyl methacrylate.

The thermoplastic polymer (D-1) is preferably prepared by an emulsion polymerization, and the polymer prepared can be recovered in powder state by a conventional after-treatment succeeding the emulsion polymerization.

The rubber-containing polymer (D-2) has a function of providing a resin composition with excellent impact resistance and elongation. The polymer (D-2) is a graft copolymer having a multi-layered structure and contains an acrylic acid alkyl ester as a main rubber component. Further, the polymer (D-2) is a component necessary for developing an excellent mat property.

The rubber-containing polymer (D-2) is prepared by polymerizing 10 to 2000 parts by weight of a monomer or its mixture comprising 50 to 100% by weight of a methacrylic acid ester and 0 to 50% by weight of a vinyl monomer copolymerizable therewith in at least one stage in the presence of 100 parts by weight of an elastic copolymer obtained by polymerizing a monomer mixture comprising 50 to 99.9% by weight of an acrylic acid alkyl ester, 0 to 40% by weight of a copolymerizable other vinyl monomer, and 0.1 to 10% by weight of a copolymerizable cross-linking monomer.

The acrylic acid alkyl ester used here includes the acrylic esters having an alkyl group with 1 to 8 carbon atoms, among which butyl acrylate and 2-ethylhexyl acrylate are preferable.

When the elastic copolymer is prepared, less than 40% by weight of another copolymerizable vinyl monomer can be copolymerized. As the vinyl monomer used here, a methacrylic acid alkyl ester such as methyl methacrylate, butyl methacrylate, and cyclohexyl methacrylate, styrene, and acrylonitrile are preferable.

A copolymerizable cross-linking monomer is further used. While the cross-linking monomer to be used is not required to be specific, it preferably includes ethylene glycol dimethacrylate, butane diol dimethacrylate allyl acrylate, allyl methacrylate, diallyl phthalate, triallyl cyanurate, triallyl isocyanurate, divinyl benzene, diallyl maleate, trimethylol triacrylate, and allyl cinnamate. These monomers can be used alone or in combination.

As the monomer to be grafted onto an elastic copolymer, more than 50% by weight of a methacrylic acid alkyl ester is used, and specifically it includes methyl methacrylate, ethyl methacrylate, butyl methacrylate, 2-ethylhexyl methacrylate, and cyclohexyl methacrylate. Further, less than 50% by weight of another copolymerizable vinyl monomer may be used. The vinyl monomer is not specifically limited, and an acrylic acid ester such as methyl acrylate, butyl acrylate, and cyclohexyl acrylate, styrene, and acrylonitrile are exemplified.

The monomer mixture to be grafted is used in an amount of 10 to 2000 parts by weight, preferably 20 to 200 parts by weight per 100 parts by weight of elastic copolymer.

The rubber-containing polymer (D-2) in the present invention is prepared by a conventional emulsion polymerization. At the time of the polymerization, a chain transfer agent and other polymerization auxiliaries may be used. As the chain transfer agent, a known compound can be used, but it is preferably a mercaptan.

The rubber-containing polymer (D-2) thus obtained is used in a range of 5 to 80% by weight in the acrylic polymer (D), and it is desirable to use more than 30% by weight, and more than 50% by weight in particular to develop mat property.

The thermoplastic polymer (D-3) used in the present invention is prepared from 50 to 99.9% by weight of a methacrylic acid ester having an alkyl group of 1 to 4 carbon atoms, 0.1 to 50% by weight of an acrylic acid ester having an alkyl group of 1 to 8 carbon atoms, and 0 to 50% by weight of another vinyl monomer copolymerizable therewith, and has a reduced viscosity (determined by dissolving 0.1 g of polymer in 100 ml of chloroform, and at 25° C.) of lower than 0.1 L/g.

The methacrylic acid ester used for the thermoplastic polymer (D-3) includes methyl methacrylate, ethyl methacrylate, and butyl methacrylate, among which methyl methacrylate is most desirable. The acrylic acid ester includes methyl acrylate, ethyl acrylate, and butyl acrylate. The acrylic acid ester is used in a range of 0.1 to 50% by weight and preferably in a range of 0.5 to 40% by weight. As the other copolymerizable vinyl monomer, a known monomer can be used.

The method for preparing the thermoplastic polymer (D-3) is not specifically limited and it can be prepared by a conventional suspension polymerization, emulsion polymerization, or bulk polymerization. At the time of the polymerization, a chain transfer agent as well as other polymerization auxiliaries may be used. As the chain transfer agent, a known compound can be used, and a mercaptan is preferable.

As one of the characteristics of the present invention, it can be mentioned that the haze of the thermoplastic resin product is improved when the acrylic multi-layered polymer (C) or acrylic polymer (D) is used as the thermoplastic resin (A). When an acrylic resin is used as a film, as one of its applications, it is sometimes laminated on a polyvinyl chloride resin to improve the weather resistance of the polyvinyl chloride resin. In this instance, it is necessary that the patterns printed on a polyvinyl chloride resin be clearly visible through the acrylic film, and thus it is desirable for the acrylic resin film to have a low haze value. When the thermoplastic resin composition (I) in the present invention is used, the haze is improved, while the improvement is insufficient when a matting agent disclosed in Unexamined Japanese Patent Publication No. 56-36535 was used.

As the method for mixing the thermoplastic resin composition (I), suitable ones that can generally be used are: a method wherein a polymer blend is passed through a screw type extruder in which the blend is subjected to shear and compression at the same time, a method wherein a polymer blend is kneaded between heated rolls, and a method wherein a polymer blend is mixed in a hot high shearing type mixer such as a Banbury mixer.

The thermoplastic resin composition (I) in the present invention may contain ordinary compounding agents, for example, a stabilizer, lubricant, processing aid, impact modifier, plasticizer, foaming agent, filler, and colorant. The thermoplastic resin composition (I) of the present invention thus obtained can easily be formed into a film or sheet by a conventional method, for example, a T-die method, inflation method, calender method, and extrusion molding method.

Further, according to the present invention, a thermoplastic resin laminate can be produced which has the thermoplastic resin composition (I) on its surface and thus has an excellent mat property. As the substrate material on which the thermoplastic resin composition (I) is laminated, a known thermoplastic resin can be used, among which an acrylic resin, polycarbonate resin, polyvinyl chloride resin, or ABS resin is preferable.

The method for producing a thermoplastic resin laminate having an excellent mat property by using the thermoplastic resin composition (I) is not specifically limited, and a known lamination can be adopted. Specifically, a method is preferable wherein a film of one polymer is first formed and then a solution containing the other polymer is cast on the surface of the first polymer film, and finally the solvent is evaporated off. Also, a co-extrusion method using an extruder, extrusion laminating method, and heat laminating method using heated rolls are preferable.

Further, the thermoplastic resin laminate of the present invention may be provided with an intermediate layer between the thermoplastic resin composition (I) of the surface layer and the substrate thermoplastic resin.

Still further, according to the present invention, printing can easily be applied on the thermoplastic resin composition (I) and the laminate, and the design effect can be remarkably enhanced.

According to the present invention, the mat property of thermoplastic resin compositions can be greatly improved without impairing their surface conditions by using the copolymer (B) as matting agent, while the mat property becomes unsatisfactory when a conventional matting agent is used.

In the following, the present invention is explained in more detail with reference to Examples and Comparative Examples. However, it should be understood that the present invention is by no means restricted by those Examples. In the Examples, "part" or "parts" means "part by weight" or "parts by weight" unless specified otherwise.

The properties of resin compositions shown in the Examples are determined or evaluated by the methods as follows:

(1) 60° C. Surface gloss: 60° C. Surface gloss was determined by using a gloss meter GM-26D manufactured by Murakami Color Institute.

(2) Surface conditions: Surface conditions (with respect to roughness and evenness) were evaluated through visual observation as a criterion for evaluating the dispersing quality of a matting agent and each of the symbols shown in the Tables indicates the condition as follows:
o: excellent
Δ: ordinary
x: poor (3) Izod impact strength: Izod impact strength (kg·cm/cm$^2$) was determined according to ASTM D-256: V-notch.

(4) Haze: Haze was determined by using a haze meter SEP-H-SS (manufactured by Japan Precision Optics Co., Ltd.) after a sample resin composition was formed into a film having a thickness of 50 μm and then a soap-and-water solution was applied on the film to smooth its surface.

Example 1
(1) Preparation of a copolymer (B):

A reaction vessel equipped with a stirrer, reflux condenser, and nitrogen gas inlet was charged with the following mixture:
Methyl acrylate 20 parts
Methyl methacrylate 60 parts
2-Hydroxyethyl methacrylate 20 parts
t-Dodecyl mercaptan 0.5 part
Lauroyl peroxide 1 part
Calcium tertiary phosphate 5 part
Deionized water 250 parts After sufficiently replacing the air in the reaction vessel with nitrogen gas, the mixture mentioned above was heated to 75° C. while stirring to conduct the polymerization in nitrogen gas stream. After 3 hours, the temperature was elevated to 90° C. and the mixture was further kept at that temperature for 45 min to complete the polymerization. The reaction product was dehydrated and dried to obtain a copolymer (B).

(2) Preparation of an acrylic polymer having a multi-layered structure (C):

A polymerization vessel equipped with a cooler was charged with 250 parts of water, 2 parts of sodium salt of sulfosuccinic acid ester, and 0.05 part of sodium formaldehyde sulfoxylate. After stirring under nitrogen gas, a mixture comprising 1.6 parts of methyl methacrylate, 8 parts of butyl acrylate, 0.4 part of 1,3-butylene glycol dimethacrylate, 0.1 part of allyl methacrylate, and 0.04 part of cumene hydroperoxide was further charged in the polymerization vessel. After the temperature was elevated to 70° C., the reaction was continued for 60 min to complete the polymerization for a polymer of the innermost layer (C-a). Then a mixture for forming a cross-linked elastic polymer (C-b) comprising 1.5 parts of methyl methacrylate, 22.5 parts of butyl acrylate, 1.0 part of 1,3-butylene glycol dimethacrylate, 0.25 part of allyl methacrylate, and 0.05 part of cumene hydroperoxide was added in 60 min and the mixture was subjected to polymerization to obtain a 2-layered cross-linked rubber-like elastic polymer.

The 2-layered cross-linked rubber-like elastic polymer thus obtained was tested for its swelling degree and gel content by the methods mentioned before, and the polymer was found to have a swelling degree of 10% and gel content of 90%, respectively.

Thereafter, a monomer mixture for a polymer of an intermediate layer (C-d) comprising 5 parts of methyl methacrylate, 5 parts of butyl acrylate and 0.1 part of allyl methacrylate was subjected to reaction, and finally a monomer mixture for a polymer of the outermost layer (C-c) comprising 52.25 parts of methyl methacrylate and 2.75 parts of butyl acrylate was subjected to a reaction to complete the polymerization.

The polymer emulsion thus obtained was subjected to a salting out by using 5 parts, per 100 parts of the polymer, of calcium chloride, washed with water, and dried to obtain a polymer having a multi-layered structure (C).

The amount of residual calcium in the final polymer composition was about 200 ppm.

(3) Preparation of a mat thermoplastic resin composition (I):

The polymer having a multi-layered structure (C) in an amount of 100 parts obtained in procedure (2) of this Example was blended with 10 parts of the copolymer (B) obtained in procedure (1) of this Example, and extruded through a twin-screw extruder at 240° C. and cut to form pellets. The pellets thus obtained were dried and then formed into a film having a thickness of about 50 μm at 240° C. by a T-die method. The film was evaluated for the 60° surface gloss and surface conditions. The results thus obtained are shown in Table 1.

Examples 2 through 8

Example 1 was repeated except that the composition of the copolymer (B) and the amount of the copolymer (B) which was blended with the polymer having a multi-layered structure (C) were changed as shown in Table 1. The results are also shown in Table 1.

Example 9
(1) Preparation of copolymers (B):

Methyl acrylate in an amount of 10 parts was mixed with methyl methacrylate and various kinds of methacrylic acid hydroxyalkyl esters at different ratios as shown in Table 2. In each of the mixtures was dissolved 0.35 part of n-octyl mercaptan, and the mixtures were charged in a reaction vessel, respectively. Further, 0.35 part of lauroyl peroxide as polymerization catalyst, 0.02 part of a copolymer of methyl methacrylate with sulfoethyl sodium salt of methacrylic acid as suspension stabilizer, 0.35 part of sodium sulfate, and 145 parts of deionized water as dispersing medium were also charged in the reaction vessel, respectively. Polymerization was conducted at 70° C. After the inside temperature of the reaction vessel reached a peak, the reaction products were kept at 95° C. for 30 min, and then cooled and subjected to filtration, washing with water, and drying to obtain copolymers (B) having a hydroxy group.

(2) Preparation of a thermoplastic polymer (D-1):

A reaction vessel was charged with 200 parts of deionized water and further charged with 1 part of potassium oleate as emulsifier and 0.3 part of potassium persulfate. Thereafter, 40 parts of methyl methacrylate, 10 parts of n-butyl acrylate, and 0.005 part of n-octyl mercaptan were charged. The air in the reaction vessel was replaced with nitrogen gas and the contents in the reaction vessel were heated at 65° C. for 3 hours while stirring under a nitrogen atmosphere to complete the polymerization. Then a monomer mixture of 48 parts of methyl methacrylate with 2 parts of n-butyl acrylate was added dropwise to the vessel over a period of 2 hours. After completing the monomer addition, the contents were kept at the same temperature for 2 hours to complete polymerization. The polymer latex thus obtained was added to a 0.25% aqueous solution of sulfuric acid to salt out the polymer, and the polymer thus obtained was dehydrated and dried to recover a polymer in powder state. The polymer thus obtained was found to have an η sp/c of 0.38 L/g.

(3) Preparation of a rubber-containing polymer (D-2):

A reaction vessel was charged with the following mixture of reaction raw materials:
Butyl acrylate 77 parts
Styrene 22.7 parts
Allyl methacrylate 0.3 part
Sodium dioctylsulfosuccinate 2.0 parts
Deionized water 300 parts
Potassium persulfate 0.3 part
Disodium phosphate 12 hydrates 0.5 part
Sodium hydrogenphosphate dihydrates 0.3 part The mixture was heated at 50° C. for 4 hours under a nitrogen atmosphere while stirring to complete the polymerization and to obtain an elastic polymer latex.

The polymer latex in an amount of 100 parts (as solid content) was taken up in a reaction vessel. After the air in the reaction vessel was sufficiently replaced with nitrogen gas while stirring, the mixture was heated up to 80° C., added with an aqueous solution comprising 0.125 part of sodiumformaldehyde sulfoxylate and 2 parts of deionized water, further added dropwise with a mixture comprising 60 parts of methyl methacrylate, 0.05 part of n-octyl mercaptan, and 0.125 part of t-butyl hydroperoxide while keeping the temperature at 80° C., and after the addition, the temperature was further kept at 80° C. for 2 hours to complete the polymerization. The copolymer latex thus obtained was subjected to salting out, dehydration, washing with water, and drying to obtain a rubber-containing polymer (D-2) in powder state.

(4) Preparation of mat thermoplastic resin compositions (I):

Each of the copolymers (B), thermoplastic polymer (D-1), and rubber-containing polymer (D-2) obtained in the procedures (1), (2), and (3) in this Example, respectively, and a thermoplastic polymer (D-3) comprising a methyl methacrylate/methyl acrylate (90/10) copolymer having an η sp/c of 0.051 were mixed in the ratio as shown in Table 3 using a Henschel mixer. The blends were melted and kneaded using a screw type extruder (screw diameter 40 mmφ, L/D=26) at a cylinder temperature of 200° to 260° C. and a die temperature of 250° C., and formed into pellets, respectively. The pellets thus obtained were dried and then subjected to an extrusion molding under the following conditions:

Extruder 40 mmφ (screw diameter) with 300 mm T-die
Resin temperature 245° C.
Discharge 15 kg/hr (for 20 μm thickness)

The moldability of the resin compositions, and the gloss and appearance of the films thus obtained are shown in Table 4.

Examples 10 through 14

Example 9 was repeated except that the composition of the copolymer (B), and the amounts of the copolymer (B) and polymers (D-1) to (D-3) added were changed as shown in Tables 2 and 3. The results are shown in Table 4.

Example 15

(1) Preparation of a copolymer (B):

A reaction vessel equipped with a stirrer, reflux condenser, and nitrogen gas inlet was charged with the following mixture:

Styrene 30 parts
Butyl acrylate 20 parts
Methyl methacrylate 30 parts
2-Hydroxyethyl methacrylate 20 parts
Allyl methacrylate 2 parts
t-Dodecyl mercaptan 0.5 part
Lauroyl peroxide 1 part
Calcium tertiary phosphate 20 parts
Deionized water 250 parts After sufficiently replacing the air in the reaction vessel with nitrogen gas, the mixture mentioned above was heated up to 75° C. while stirring to conduct the polymerization in nitrogen gas stream. After 3 hours, the temperature was elevated to 90° C. and the mixture was further kept at that temperature for 45 min to complete the polymerization. The reaction product was dehydrated and dried to obtain a copolymer (B). The particle diameter of the beads thus obtained was 30 to 500 μm and its weight average particle diameter was about 100 μm. The beads showed the following particle size distribution:

| Mesh | Weight % |
| --- | --- |
| −32 | 1.0 |
| 32–48 | 2.4 |
| 48–100 | 13.3 |
| 100–150 | 57.1 |
| 150–200 | 15.1 |
| 200–250 | 7.6 |
| 250–400 | 3.2 |
| 400– | 0.3 |

(2) Preparation of a mat thermoplastic resin composition (I):

The copolymer (B) obtained in procedure (1) of this Example in an amount of 8 parts was blended with 100 parts of a thermoplastic resin for a methacrylic film (HIPET® HBS001 manufactured by Mitsubishi Rayon Co., Ltd.), and the blend was extruded through a twin-screw extruder at 240° C. and then cut to form pellets. The pellets thus obtained were dried and formed into a film having a thickness of about 50 μm at 240° C. by a T-die method. The 60° surface gloss and surface conditions of the film were evaluated. The results are shown in Table 5.

Examples 16 through 22

Example 15 was repeated except that the composition of the copolymer (B) and the amount of it blended with the thermoplastic resin for a methacrylic film were changed as shown in Table 5. The results are also shown in Table 5.

Example 23 (Production of a laminate)

10 parts of the copolymer (B) obtained in procedure (1) of Example 1 was blended with 100 parts of the polymer having a multi-layered structure (C) obtained in procedure (2) of Example 1, and the blend was extruded through a twin-screw extruder at 240° C. and then cut to form pellets. The pellets were dried and molded at 240° C. by a co-extrusion method together with acrylic resin pellets (ACRYPET® VH manufactured by Mitsubishi Rayon Co., Ltd.) so that the mat thermoplastic resin (I) from the blend forms a layer 100 μm thick and the acrylic resin pellets form a layer 2 mm thick, and to form a thermoplastic resin laminate having an excellent mat property. The 60° surface gloss and surface conditions of the film were evaluated. The results are shown in Table 6.

Examples 24 through 30

Example 23 was repeated except that the composition of the copolymer (B) and the amount of it blended with the polymer having the multi-layered structure (C) were changed as shown in Table 6. The results are also shown in Table 6.

Example 31

Example 23 was repeated except that the thermoplastic resin on which the mat thermoplastic resin (I) was laminated was changed to a polycarbonate resin (LEXAN® ML-5500 manufactured by GE Plastic Co.) and the molding was performed at 280° C. The results are also shown in Table 6.

Example 32

Example 23 was repeated except that the thermoplastic resin on which the mat thermoplastic resin (I) was laminated was changed to a rigid polyvinyl chloride resin composition comprising 100 parts of a poll/vinyl chloride resin (P=720), 3 parts of a stabilizer (dibutyltin maleate), 10 parts of an impact modifier (METABLEN® C-102 manufactured by Mitsubishi Rayon Co., Ltd.), 1 part of a processing aid (METABLEN® P-551 manufactured by Mitsubishi Rayon Co., Ltd.), and 1 part of a lubricant (butyl stearate), and the molding was performed at 200° C. The results are also shown in Table 6.

Example 33

Example 23 was repeated except that the thermoplastic resin on which the mat thermoplastic resin (I) was laminated was changed to an ABS resin (DIAPET® ABS3001M manufactured by Mitsubishi Rayon Co., Ltd.) and the molding was performed at 240° C. The results are also shown in Table 6.

Example 34

Example 23 was repeated except that the thermoplastic resin laminate was produced by an extrusion lamination method. Specifically, 10 parts of the copolymer (B) obtained in procedure (1) of Example 1 was blended with 100 parts of the polymer having a multi-layered structure (C), and the blend was extruded through a twin-screw extruder at 240° C. and cut to form pellets. The pellets thus obtained were dried and formed into a film having a thickness of about 50 μm by a T-die method. Then an extrusion lamination was performed by introducing the film between a melted sheet of an acrylic resin (ACRYPET® VH manufactured by Mitsubishi Rayon Co., Ltd.) and a cooling roll when the pellets of the acrylic resin were subjected to an extrusion molding at 240° C. to form a sheet 2 mm thick. The results are also shown in Table 6.

Example 35

Example 23 was repeated except that the thermoplastic resin laminate was produced by a heat lamination method. Specifically, the film obtained in procedure (3) of Example 1 was subjected to a heat lamination with a soft polyvinyl chloride resin film having a thickness of 100 μm under the conditions of 150° C., 30 kg/cm$^2$ by using a laminating roll provided with an embossed design. The results are also shown in Table 6.

Example 36 (Production of a laminate)

The copolymer (B) obtained in procedure (1) of Example 15 in an amount of 8 parts was blended with 100 parts of a thermoplastic resin for a methacrylic film (HIPET® HBS001 manufactured by Mitsubishi Rayon Co., Ltd.), and the blend was extruded through a twin-screw extruder at 240° C. and cut to form pellets. The pellets were dried and molded at 240° C. by a co-extrusion method together with acrylic resin pellets (ACRYPET® VH manufactured by Mitsubishi Rayon Co., Ltd.) so that the mat thermoplastic resin composition (I) from the blend forms a layer 100 μm thick and the acrylic resin pellets form a layer 2 mm thick, and to form a thermoplastic resin laminate having an excellent mat property. The 60° surface gloss and surface conditions of the film were evaluated. The results are shown in Table 7.

Examples 37 through 43

Example 35 was repeated except that the composition of the copolymer (B) and its amount blended to the polymer having the multi-layered structure (C) were changed as shown in Table 7. The results are shown in Table 7.

Example 44

Example 36 was repeated except that the thermoplastic resin composition on which the mat thermoplastic resin composition (I) was laminated was changed to a polycarbonate resin (LEXAN® ML-5500 manufactured by GE Plastic Co.) and the molding was performed at 280° C. The results are also shown in Table 7.

Example 45

Example 36 was repeated except that the thermoplastic resin on which the mat thermoplastic resin composition (I) was laminated was changed to a rigid polyvinyl chloride resin composition comprising 100 parts of a polyvinyl chloride resin (P=720), 3 parts of a stabilizer (dibutyltin maleate), 10 parts of an impact modifier (METABLEN® C-102 manufactured by Mitsubishi Rayon Co., Ltd.), 1 part of a processing aid (METABLEN® P-551 manufactured by Mitsubishi Rayon Co., Ltd.), and 1 part of a lubricant (butyl stearate), and the molding was performed at 200° C. The results are also shown in Table 7.

Example 46

Example 36 was repeated except that the thermoplastic resin on which the mat thermoplastic resin composition (I) was laminated was changed to an ABS resin (DIAPET® ABS3001M manufactured by Mitsubishi Rayon Co., Ltd.) and the molding was performed at 240° C. The results are also shown in Table 7.

Example 47

Example 36 was repeated except that a thermoplastic resin laminate having an excellent mat property was produced by an extrusion lamination method. Specifically, 8 parts of the copolymer (B) obtained in procedure (1) of Example 15 were blended with 100 parts of a thermoplastic resin for a methacrylic film (HIPET® HBS001 manufactured by Mitsubishi Rayon Co., Ltd.) and the blend was extruded through a twin-screw extruder at 240° C. and cut to form pellets. The pellets thus obtained were dried and formed at 240° C. into a film having a thickness of about 50 μm by a T-die method. Then an extrusion lamination was performed by introducing the film between a melted sheet of an acrylic resin (ACRYPET® VH manufactured by Mitsubishi Rayon Co., Ltd.) and a cooling roll when the pellets of the acrylic resin were subjected to an extrusion molding at 240° C. to form a sheet 2 mm thick. The results are also shown in Table 6.

Example 48

Example 36 was repeated except that a thermoplastic resin laminate having an excellent mat property was produced by a heat lamination method. Specifically, the film obtained in the procedure (2) in Example 15 was subjected to a heat lamination together with a soft polyvinyl chloride resin film having a thickness of 100 μm under the conditions of 150° C., 30 kg/cm$^2$ by using a laminating roll provided with an embossed design. The results are also shown in Table 7.

Example 49 (Blend with a rigid polyvinyl chloride resin)

A polyvinyl chloride resin (P=720) in an amount of 100 parts, 3 parts of a stabilizer (dibutyltin maleate), 10 parts of an impact modifier (METABLEN® C-102 manufactured by Mitsubishi Rayon Co., Ltd.), 1.0 part of a processing aid (METABLEN® P-551 manufactured by Mitsubishi Rayon Co., Ltd.), 1.0 part of a lubricant (butyl stearate), and 5 parts of the copolymer (B), prepared by the same manner as in procedure (1) of Example 1 except that the composition was changed as shown in Table 8, were blended, and the blend was kneaded with rolls at 165° C. and the 60° surface gloss was determined. Then the blend kneaded with the rolls was subjected to pressing at 165° C. under a pressure of 70 tons to form a sheet 2.5 mm thick, and the Izod impact strength was determined. The results are shown in Table 8.

Example 50 (Blend with a soft polyvinyl chloride resin)

A polyvinyl chloride resin (P=1100) in an amount of 100 parts, 50 parts of a plasticizer (dioctyl phthalate), 2.5 parts of a Cd-Ba type stabilizer, 0.3 part of stearic acid, and 5 parts of the copolymer (B) obtained in Example 1 were blended and kneaded with rolls at 155° C., and the 60° surface gloss was determined by the procedure similar to that in Example 49. The results are shown in Table 8.

Examples 51 through 56

Example 49 was repeated except that the composition of the copolymer (B) and the amount of it blended with the polyvinyl chloride resin were changed as shown in Table 8. The results are shown in Table 8.

Example 57 (Blend with an ABS resin)

The copolymer (B) obtained in Example 49 in an amount of 5 parts was throughly blended with 100 parts of an ABS resin (DIAPET® ABS3001 manufactured by Mitsubishi Rayon Co., Ltd.) with a Henschel mixer and the blend was extruded through an extruder provided with a screw having a diameter of 400 mmφ at 230° C., and cut into pellets.

The pellets thus obtained were dried and subjected to an injection molding at 200° C to form a sheet 3 mm thick, and the Izod impact strength and 60° surface gloss of the sheet were determined. The results are shown in Table 9.

Examples 58 through 63

Example 57 was repeated except that the composition of the copolymer (B) and its amount blended to the ABS resin were changed as shown in Table 9. The results are shown in Table 9.

Example 64 (Blend with a rigid polyvinyl chloride resin)

A polyvinyl chloride resin (P=720) in an amount of 100 parts, 3 parts of a stabilizer (dibutyltin maleate), 10 parts of an impact modifier (METABLEN® C-102 manufactured by Mitsubishi Rayon Co., Ltd.), 1.0 part of a processing aid (METABLEN® P-551 manufactured by Mitsubishi Rayon Co., Ltd.), 1.0 part of a lubricant (butyl stearate), and 5 parts of the copolymer (B) prepared in the procedure (1) in Example 15 were blended, and the blend was kneaded with rolls at 165° C., and the 60° surface gloss of the sheet was determined. Then the blend kneaded with the rolls was subjected to a pressing at 165° C. under a load of 70 tons to form a sheet 2.5 mm thick, and the Izod impact strength was determined. The results are shown in Table 10.

Example 65 (Blend with a soft polyvinyl chloride resin)

A polyvinyl chloride resin (P=1100) in an amount of 100 parts, 50 parts of a plasticizer (dioctyl phthalate), 2.5 parts of a Cd-Ba type stabilizer, 0.3 part of stearic acid, and 5 parts of the copolymer (B) obtained in Example 15 were blended and kneaded with rolls at 155° C., and the 60° surface gloss was determined by the procedure similar to that in Example 64. The results are shown in Table 10.

Examples 66 through 72

Example 64 was repeated except that the composition of the copolymer (B) and the amount of it blended with the polyvinyl chloride resin were changed as shown in Table 10. The results are shown in Table 10.

Example 73 (Blend with an ABS resin)

The copolymer (B) obtained in the procedure (1) in Example 15 in an amount of 5 parts was throughly blended with 100 parts of an ABS resin (DIAPET® ABS3001 manufactured by Mitsubishi Rayon Co., Ltd.) with a Henschel mixer and the blend was extruded through an extruder provided with a screw having a diameter of 40 mmφ at 230° C., and cut into pellets.

The pellets thus obtained were dried and subjected to an injection molding at 200° C. to form a sheet 3 mm thick, and the Izod impact strength and 60° surface gloss were determined. The results are shown in Table 11.

Examples 74 through 80

Example 73 was repeated except that the composition of the copolymer (B) and the amount of it blended with the ABS resin were changed as shown in Table 11. The results are shown in Table 11.

Comparative Example 1

Only the polymer having a multi-layered structure (C) obtained in procedure (2) of Example 1 was formed into a film having a thickness of about 50 μm in the same manner as in procedure (3) of Example 1, and the 60° surface gloss and surface conditions of the film were evaluated to obtain the results as shown in Table 1. From this Comparative Example, it can be understood that the mat property cannot be developed when the copolymer (B) is not used.

Comparative Example 2

The polymer having a multi-layered structure (C) obtained in procedure (2) of Example 1 in an amount of 100 parts was blended with 10 parts of a cross-linked matting agent (METABLEN® F410 manufactured by Mitsubishi Rayon Co., Ltd.), and the blend was formed into a film having a thickness of about 50 μm in the same manner as in procedure (3) of Example 1, and the 60° surface gloss and surface conditions of the film were evaluated to obtain the results as shown in Table 1. From this Comparative Example, it can be understood that the mat property can be improved by the copolymerization of a (meth)acrylic acid hydroxyalkyl ester without impairing the surface conditions of the film.

Comparative Examples 3 through 5

Example 1 was repeated except that the composition of the copolymer (B) was changed as shown in Table 1. The results are shown in Table 1. From these Comparative Examples, it can be understood that the composition of the copolymer (B) is important to obtain resin compositions having an excellent mat property.

Comparative Example 6

Example 9 was repeated except that a cross-linked matting agent (METABLEN® F410 manufactured by Mitsubishi Rayon Co., Ltd.) was used instead of the copolymer (B). The results are shown in Table 4. From this Comparative Example, it can be understood that the mat property can be improved by the use of the copolymer (B).

Comparative Example 7

Example 9 was repeated except that the copolymer (B) was not used. The results are shown in Table 4. From this Comparative Example, it can be understood that the mat property cannot be developed when the copolymer (B) is not used.

Comparative Example 8

Example 9 was repeated except that the thermoplastic polymer (D-1) was not used. The results are shown in Table 4. From this Comparative Example, it can be understood that excellent films cannot be obtained when the thermoplastic polymer (D-1) is not used.

Comparative Example 9

Example 9 was repeated to produce a film except that the amount of a (meth)acrylic acid hydroxyalkyl ester in the copolymer (B) was increased to 85% by weight. The results are shown in Table 4. From this Comparative Example, it can be understood that excellent films cannot be obtained when the amount of a (meth)acrylic acid hydroxyalkyl ester in the copolymer (B) exceeds 85% by weight.

Comparative Example 10

Example 9 was repeated except that the rubber-containing polymer (D-2) was not used. The results are shown in Table 4. From this Comparative Example, it can be understood that an excellent mat property cannot be developed when the rubber-containing polymer (D-2) is not used.

Comparative Example 11

Example 15 was repeated except that the mixture to be charged in the reaction vessel was changed as follows:

Styrene 60 parts

Butyl acrylate 20 parts

Methyl methacrylate 20 parts

Allyl methacrylate 3 parts t-Dodecyl mercaptan 0.1 part

Lauroyl peroxide 0.5 part

Polyvinyl alcohol 1 part

Deionized water 250 parts

The results are shown in Table 5. From this Comparative Example, it can be understood that the mat property can be improved without impairing the surface conditions of the film by use of a copolymer containing a (meth)acrylic acid hydroxyalkyl ester unit.

Comparative Example 12

Only the thermoplastic resin for a methacrylic film (HIPET® HBS001 manufactured by Mitsubishi Rayon Co., Ltd.) was formed into a film having a thickness of about 50 μm in a manner similar to procedure (2) of Example 15. The 60° surface gloss and surface conditions of the film were evaluated and the results are shown in Table 5.

Comparative Example 13

Example 15 was repeated except that the composition of the compound (B) and the amount of it blended with the thermoplastic resin for a methacrylic film were changed as shown in Table 5. The results are also shown in Table 5. From these Comparative Examples, it can be understood that the composition of the copolymer (B) in terms of the combination of non cross-linking monomers and the amount of cross-linking monomer are important to obtain excellent mat thermoplastic resin compositions.

Comparative Example 14

Only the polymer having a multi-layered structure (C) obtained in procedure (2) of Example 1 was formed into a film and laminated in the same manner as in Example 23. The 60° surface gloss and surface conditions of the laminate were evaluated and the results are shown in Table 6.

Comparative Example 15

The polymer having a multi-layered structure (C) obtained in procedure (2) of Example 1 in an amount of 100 parts was blended with 10 parts of a cross-linked matting agent (METABLEN® F410 manufactured by Mitsubishi Rayon Co., Ltd.), and the blend was formed into a film and laminated in the same manner as in Example 23. The 60° surface gloss and surface conditions of the laminate were evaluated and the results are shown in Table 6.

Comparative Examples 16 through 18

Example 23 was repeated to obtain a laminate except that the composition of the compound (B) was changed as shown in Table 6. The results are also shown in Table 6.

Comparative Example 19

Example 36 was repeated to obtain a laminate except that the composition of the copolymer (B) was changed as shown in Table 7. The 60° surface gloss and surface conditions of the laminate were evaluated and the results are also shown in Table 7.

Comparative Example 20

Example 36 was repeated to obtain a laminate except that the composition of the copolymer (B) was not used. The 60° surface gloss and surface conditions of the film were evaluated and the results are also shown in Table 7.

Comparative Example 21

Example 36 was repeated to obtain a laminate except that the composition of the copolymer (B) was changed as shown in Table 7. The results are also shown in Table 7.

Comparative Example 22

Example 49 was repeated except that a silica gel was used instead of the copolymer (B). The results are shown in Table 8.

Comparative Example 23

Example 50 was repeated except that a silica gel was used instead of the copolymer (B). The results are shown in Table 8.

Comparative Example 24

Example 49 was repeated except that the composition of the copolymer (B) was changed as shown in Table 8. The results are shown in Table 8.

Comparative Example 25

Example 50 was repeated except that the composition of the copolymer (B) was changed as shown in Table 8. The results are shown in Table 8.

Comparative Example 26

Example 49 was repeated except that the copolymer (B) was not used. The results are shown in Table 8.

Comparative Example 27

Example 50 was repeated except that the copolymer (B) was not used. The results are shown in Table 8.

Comparative Examples 28 and 29

Example 49 was repeated except that the composition of the copolymer (B) and the amount of it blended with the polyvinyl chloride resin were changed as shown in Table 8. The results are shown in Table 8.

Comparative Example 30

Example 57 was repeated except that a silica gel was blended instead of the copolymer (B). The results are shown in Table 9.

Comparative Example 31

Example 57 was repeated except that the composition of the copolymer (B) was changed as shown in Table 9. The results are shown in Table 9.

Comparative Example 32

Example 57 was repeated except that the copolymer (B) was not used. The results are shown in Table 9.

Comparative Example 33

Example 57 was repeated except that the composition of the copolymer (B) and the amount of it blended with the ABS resin were changed as shown in Table 9. The results are shown in Table 9.

Comparative Example 34

Example 64 was repeated except that a silica gel was used instead of the copolymer (B). The results are shown in Table 10.

Comparative Example 35

Example 65 was repeated except that a silica gel was used instead of the copolymer (B). The results are shown in Table 10.

Comparative Example 36

Example 64 was repeated except that the copolymer (B) prepared in Comparative Example 11 was used. The results are shown in Table 10.

Comparative Example 37

Example 65 was repeated except that the copolymer (B) prepared in Comparative Example 11 was used. The results are shown in Table 10.

Comparative Example 38

Example 64 was repeated except that the copolymer (B) was not used. The results are shown in Table 10.

Comparative Example 39

Example 65 was repeated except that the copolymer (B) was not used. The results are shown in Table 10.

Comparative Example 40

Example 64 was repeated except that the composition of the copolymer (B) was changed as shown in Table 10. The results are shown in Table 10.

Comparative Example 41

Example 73 was repeated except that the copolymer (B) prepared in Comparative Example 11 was used. The results are shown in Table 11.

Comparative Example 42

Example 73 was repeated except that the copolymer (B) was not used. The results are shown in Table 11.

Comparative Example 43

Example 73 was repeated except that the composition of the copolymer (B) was changed as shown in Table 11. The results are shown in Table 11.

TABLE 1

| | Composition of copolymer (B) (parts) | | | Blended amount (parts) | 60° Gloss (%) | Surface Conditions | Haze (%) |
|---|---|---|---|---|---|---|---|
| | Hydroxyalkyl (meth)acrylate | Methyl methacrylate | Alkyl acrylate | | | | |
| Example 1 | 2-HEMA 20 | 60 | MA 20 | 10 | 13 | o | 7.32 |
| Example 2 | 2-HEMA 50 | 40 | MA 10 | 5 | 10 | o | 8.37 |
| Example 3 | 2-HEMA 20 | 60 | MA 20 | 20 | 10 | o | 8.89 |
| Example 4 | 2-HEMA 20 | 60 | MA 20 | 5 | 23 | o | 6.98 |
| Example 5 | 2-HEMA 20 | 60 | EA 20 | 10 | 14 | o | — |
| Example 6 | 2-HEMA 20 | 60 | BA 20 | 10 | 19 | o | — |
| Example 7 | 2-HPMA 20 | 60 | MA 20 | 10 | 15 | o | — |
| Example 8 | 4-HBA 20 | 60 | MA 20 | 10 | 17 | o | — |
| Comparative Example 1 | | None | | — | 144 | o | 0.44 |
| Comparative Example 2 | | METABLEN ® F410* | | 10 | 29 | Δ | 15.5 |
| Comparative Example 3 | None | 80 | MA 20 | 10 | 130 | o | — |
| Comparative Example 4 | 2-HEMA 0.3 | 79.7 | MA 20 | 40 | 75 | o | — |
| Comparative Example 5 | 2-HEMA 85 | 10 | MA 5 | 10 | 42 | x | — |

2-HEMA: 2-Hydroxyethyl methacrylate
2-HPMA: 2-Hydroxypropyl methacrylate
4-HBA: 4-Hydroxybutyl acrylate
MA: Methyl acrylate
EA: Ethyl acrylate
BA: Butyl acrylate
*Cross-linked matting agent manufactured by Mitsubishi Rayon Co., Ltd.

TABLE 2

| Copolymer (B) | MA (parts) | MMA (parts) | HEMA (parts) |
|---|---|---|---|
| Polymer 1 | 10 | 70 | 20 |
| Polymer 2 | 10 | 60 | 30 |
| Polymer 3 | 10 | 40 | 50 |
| Polymer 4 | 10 | 5 | 85 |

MA: Methyl acrylate
MMA: Methyl methacrylate
HEMA: Hydroxyethyl methacrylate

TABLE 3

| | Thermoplastic polymer (D-1) Added amount (parts) | Rubber-containing polymer (D-2) Added amount (parts) | Thermoplastic polymer (D-3) Added amount (parts) | Copolymer (B) Kind | Copolymer (B) Added amount (parts) |
|---|---|---|---|---|---|
| Example 9 | 5.5 | 55.5 | 39.0 | 1 | 11 |
| Example 10 | 5.5 | 55.5 | 39.0 | 2 | 11 |
| Example 11 | 5.5 | 55.5 | 39.0 | 3 | 11 |
| Example 12 | 16.7 | 44.4 | 38.9 | 3 | 11 |
| Example 13 | 11.1 | 61.1 | 27.8 | 3 | 11 |
| Example 14 | 2.2 | 77.8 | 20.0 | 3 | 11 |
| Comparative Example 6 | 5.5 | 55.5 | 39.0 | F-410 | 11 |
| Comparative Example 7 | 5.0 | 50.0 | 45.0 | — | 0 |
| Comparative Example 8 | 0 | 55.5 | 44.5 | 1 | 11 |
| Comparative Example 9 | 5.5 | 55.5 | 39.0 | 4 | 11 |
| Comparative Example 10 | 15.0 | 0 | 85.0 | 3 | 11 |

F-410: Cross-linked matting agent, METABLEN ® F-410 manufactured by Mitsubishi Rayon Co., Ltd.

TABLE 4

| | Moldability to film | Gloss of film (%) | Appearance | Haze (%) |
|---|---|---|---|---|
| Example 9 | o | 27 | o | 5.20 |
| Example 10 | o | 23 | o | 6.61 |
| Example 11 | o | 18 | o | 8.74 |
| Example 12 | o | 25 | o | — |
| Example 13 | o | 17 | o | — |
| Example 14 | o | 15 | o | — |
| Comparative Example 6 | o | 30 | Δ | 16.8 |
| Comparative Example 7 | o | 115 | o | 0.37 |
| Comparative Example 8 | x[1] | — | — | — |
| Comparative Example 9 | o | — | x[2] | — |
| Comparative Example 10 | Δ | 56 | Δ | — |

[1] Film formation was impossible due to uneven thickness.
[2] Appearance was poor because many fish eyes were produced.

TABLE 5

| | Composition of copolymer (B) (parts) | | | | | Blended amount (parts) | 60° Gloss (%) | Surface conditions |
|---|---|---|---|---|---|---|---|---|
| | Hydroxyalkyl (meth)acrylate | | Methyl methacrylate | Butyl acrylate | Styrene | Allyl methacrylate | | | |
| Example 15 | 2-HEMA | 20 | 30 | 20 | 30 | 2 | 8 | 17 | o |
| Example 16 | 2-HEMA | 5 | 45 | 20 | 30 | 2 | 8 | 20 | o |
| Example 17 | 2-HEMA | 35 | 15 | 20 | 30 | 2 | 8 | 15 | o |
| Example 18 | 2-HEMA | 30 | 40 | 20 | 10 | 0.2 | 8 | 19 | o |
| Example 19 | 2-HEMA | 20 | 30 | 20 | 30 | 2 | 20 | 14 | o |
| Example 20 | 2-HEMA | 20 | 30 | 20 | 30 | 2 | 3 | 21 | o |
| Example 21 | 2-HPMA | 20 | 30 | 20 | 30 | 2 | 8 | 19 | o |
| Example 22 | 4-HBA | 20 | 30 | 20 | 30 | 2 | 8 | 19 | o |
| Comparative Example 11 | — | | 20 | 20 | 60 | 3 | 8 | 26 | o |
| Comparative Example 12 | None | | | | | | 0 | 113 | o |
| Comparative Example 13 | 2-HEMA | 20 | 30 | 20 | 30 | 7 | 8 | 19 | x |

2-HEMA: 2-Hydroxyethyl methacrylate
2-HPMA: 2-Hydroxypropyl methacrylate
4-HBA: 4-Hydroxybutyl acrylate

TABLE 6

| | Composition of copolymer (B) (parts) | | | | Alkyl acrylate | | Added amount (parts) | Thermoplastic resin used | Method for lamination | 60° Gloss (%) | Surface conditions |
|---|---|---|---|---|---|---|---|---|---|---|---|
| | Hydroxyalkyl (meth)acrylate | | Methyl methacrylate | | | | | | | | |
| Example 23 | 2-HEMA | 20 | 60 | MA | 20 | | 10 | Acrylic | Co-extrusion | 13 | o |
| Example 24 | 2-HEMA | 50 | 40 | MA | 10 | | 5 | Acrylic | Co-extrusion | 10 | o |
| Example 25 | 2-HEMA | 20 | 60 | MA | 20 | | 20 | Acrylic | Co-extrusion | 10 | o |
| Example 26 | 2-HEMA | 20 | 60 | MA | 20 | | 5 | Acrylic | Co-extrusion | 23 | o |
| Example 27 | 2-HEMA | 20 | 60 | EA | 20 | | 10 | Acrylic | Co-extrusion | 14 | o |
| Example 28 | 2-HEMA | 20 | 60 | BA | 20 | | 10 | Acrylic | Co-extrusion | 19 | o |
| Example 29 | 2-HPMA | 20 | 60 | MA | 20 | | 10 | Acrylic | Co-extrusion | 15 | o |
| Example 30 | 4-HBA | 20 | 60 | MA | 20 | | 10 | Acrylic | Co-extrusion | 17 | o |
| Example 31 | 2-HEMA | 20 | 60 | MA | 20 | | 10 | Polycarbonate | Co-extrusion | 12 | o |
| Example 32 | 2-HEMA | 20 | 60 | MA | 20 | | 10 | Polyvinyl chloride | Co-extrusion | 14 | o |
| Example 33 | 2-HEMA | 20 | 60 | MA | 20 | | 10 | ABS | Co-extrusion | 13 | o |
| Example 34 | 2-HEMA | 20 | 60 | MA | 20 | | 10 | Acrylic | Extrusion lamination | 20 | o |
| Example 35 | 2-HEMA | 20 | 60 | MA | 20 | | 10 | Polyvinyl chloride | Heat lamination | 6 | o |
| Comparative Example 14 | None | | | | | | — | Acrylic | Co-extrusion | 144 | o |
| Comparative Example 15 | METABLEN ® F410* | | | | | | 10 | Acrylic | Co-extrusion | 29 | Δ |
| Comparative Example 16 | None | | 80 | MA | 20 | | 10 | Acrylic | Co-extrusion | 130 | o |
| Comparative Example 17 | 2-HEMA | 0.3 | 79.7 | MA | 20 | | 40 | Acrylic | Co-extrusion | 75 | o |
| Comparative Example 18 | 2-HEMA | 85 | 10 | MA | 5 | | 10 | Acrylic | Co-extrusion | 42 | x |

2-HEMA: 2-Hydroxyethyl methacrylate
2-HPMA: 2-Hydroxypropyl methacrylate
4-HBA: 4-Hydroxybutyl acrylate
MA: Methyl acrylate
EA: Ethyl acrylate
BA: Butyl acrylate
*Cross-linked matting agent manufactured by Mitsubishi Rayon Co., Ltd.

TABLE 7

|  | Composition of copolymer (B) (parts) | | | | | Thermo- | | | | |
|---|---|---|---|---|---|---|---|---|---|---|
|  | Hydroxyalkyl (meth)acrylate | | Methyl meth-acrylate | Butyl acrylate | Styrene | Allyl meth-acrylate | plastic resin used | Method for lamination | Blended amount (parts) | 60° Gloss (%) | Surface condi-tions |
| Example 36 | 2-HEMA | 20 | 30 | 20 | 30 | 2 | Acrylic | Co-extrusion | 8 | 17 | o |
| Example 37 | 2-HEMA | 5 | 45 | 20 | 30 | 2 | Acrylic | Co-extrusion | 8 | 20 | o |
| Example 38 | 2-HEMA | 35 | 15 | 20 | 30 | 2 | Acrylic | Co-extrusion | 8 | 15 | o |
| Example 39 | 2-HEMA | 30 | 40 | 20 | 10 | 0.2 | Acrylic | Co-extrusion | 8 | 19 | o |
| Example 40 | 2-HEMA | 20 | 30 | 20 | 30 | 2 | Acrylic | Co-extrusion | 20 | 14 | o |
| Example 41 | 2-HEMA | 20 | 30 | 20 | 30 | 2 | Acrylic | Co-extrusion | 3 | 21 | o |
| Example 42 | 2-HPMA | 20 | 30 | 20 | 30 | 2 | Acrylic | Co-extrusion | 8 | 19 | o |
| Example 43 | 4-HBA | 20 | 30 | 20 | 30 | 2 | Acrylic | Co-extrusion | 8 | 19 | o |
| Example 44 | 2-HEMA | 20 | 30 | 20 | 30 | 2 | Polycarbonate | Co-extrusion | 8 | 16 | o |
| Example 45 | 2-HEMA | 20 | 30 | 20 | 30 | 2 | Polyvinyl chloride | Co-extrusion | 8 | 18 | o |
| Example 46 | 2-HEMA | 20 | 30 | 20 | 30 | 2 | ABS | Co-extrusion | 8 | 17 | o |
| Example 47 | 2-HEMA | 20 | 30 | 20 | 30 | 2 | Acrylic | Extrusion lamination | 8 | 24 | o |
| Example 48 | 2-HEMA | 20 | 30 | 20 | 30 | 2 | Polyvinyl chloride | Heat lamination | 8 | 10 | o |
| Comparative Example 19 | — | | 20 | 20 | 60 | 3 | Acrylic | Co-extrusion | 8 | 26 | o |
| Comparative Example 20 | None | | | | | | Acrylic | Co-extrusion | 0 | 113 | o |
| Comparative Example 21 | 2-HEMA | 20 | 30 | 20 | 30 | 7 | Acrylic | Co-extrusion | 8 | 19 | x |

2-HEMA: 2-Hydroxyethyl methacrylate
2-HPMA: 2-Hydroxypropyl methacrylate
4-HBA: 4-Hydroxybutyl acrylate

TABLE 8

|  | Composition of copolymer (B) (parts) | | | | Blended amount (parts) | 60° Gloss (%) | Surface conditions | Izod impact strength (kg · cm/cm²) |
|---|---|---|---|---|---|---|---|---|
|  | Hydroxyalkyl (meth)acrylate | | Methyl methacrylate | Butyl acrylate | | | | |
| Example 49 | 2-HEMA | 20 | 60 | 20 | 5 | 21 | o | 19.5 |
| Example 50 | 2-HEMA | 20 | 60 | 20 | 5 | 29 | o | — |
| Example 51 | 2-HEMA | 10 | 70 | 20 | 5 | 24 | o | 19.8 |
| Example 52 | 2-HEMA | 30 | 50 | 20 | 5 | 18 | o | 18.8 |
| Example 53 | 2-HEMA | 20 | 60 | 20 | 3 | 23 | o | 20.0 |
| Example 54 | 2-HEMA | 20 | 60 | 20 | 10 | 17 | o | 18.4 |
| Example 55 | 2-HPMA | 20 | 60 | 20 | 5 | 22 | o | 19.6 |
| Example 56 | 4-HBA | 20 | 60 | 20 | 5 | 22 | o | 19.8 |
| Comparative Example 22 | Silica gel was used. | | | | 5 | 48 | o | 0.7 |
| Comparative Example 23 | Silica gel was used. | | | | 5 | 55 | o | — |
| Comparative Example 24 | None | | 80 | 20 | 5 | 80 | o | 20.4 |
| Comparative Example 25 | None | | 80 | 20 | 5 | 85 | o | — |
| Comparative Example 26 | | | None | | 0 | 83 | o | 20.7 |
| Comparative Example 27 | | | None | | 0 | 88 | o | — |
| Comparative Example 28 | 2-HEMA | 0.3 | 79.7 | 20 | 5 | 56 | o | 20.4 |
| Comparative Example 29 | 2-HEMA | 85 | 10 | 5 | 5 | 19 | Δ | 16.8 |

2-HEMA: 2-Hydroxyethyl methacrylate
2-HPMA: 2-Hydroxypropyl methacrylate
4-HBA: 4-Hydroxybutyl acrylate

TABLE 9

| | Composition of copolymer (B) (parts) | | | Blended amount (parts) | 60° Gloss (%) | Izod-impact strength (kg · cm/cm$^2$) |
|---|---|---|---|---|---|---|
| | Hydroxyalkyl (meth)acrylate | Methyl methacrylate | Butyl acrylate | | | |
| Example 57 | 2-HEMA 20 | 60 | 20 | 5 | 21 | 24.8 |
| Example 58 | 2-HEMA 10 | 70 | 20 | 5 | 29 | 25.0 |
| Example 59 | 2-HEMA 30 | 50 | 20 | 5 | 24 | 24.4 |
| Example 60 | 2-HEMA 20 | 60 | 20 | 3 | 18 | 25.0 |
| Example 61 | 2-HEMA 20 | 60 | 20 | 10 | 23 | 24.0 |
| Example 62 | 2-HPMA 20 | 60 | 20 | 5 | 17 | 24.8 |
| Example 63 | 4-HBA 20 | 60 | 20 | 5 | 22 | 25.1 |
| Comparative Example 30 | Silica gel was used. | | | 5 | 40 | 1.5 |
| Comparative Example 31 | None | 80 | 20 | 5 | 80 | 25.1 |
| Comparative Example 32 | None | | | 0 | 83 | 25.3 |
| Comparative Example 33 | 2-HEMA 0.37 | 79.7 | 20 | 5 | 51 | 25.1 |

2-HEMA: 2-Hydroxyethyl methacrylate
2-HPMA: 2-Hydroxypropyl methacrylate
4-HBA: 4-Hydroxybutyl acrylate

TABLE 10

| | Composition of copolymer (B) | | | | | Blended amount (parts) | 60° Gloss (%) | Surface conditions | Izod impact strength (kg · cm/cm$^2$) |
|---|---|---|---|---|---|---|---|---|---|
| | Hydroxyalkyl (meth)acrylate | Methyl methacrylate | Butyl acrylate | Styrene | Allyl methacrylate | | | | |
| Example 64 | 2-HEMA 20 | 30 | 20 | 30 | 2 | 5 | 20 | o | 19.0 |
| Example 65 | 2-HEMA 20 | 30 | 20 | 30 | 2 | 5 | 27 | o | — |
| Example 66 | 2-HEMA 5 | 45 | 20 | 30 | 2 | 5 | 25 | o | 19.3 |
| Example 67 | 2-HEMA 35 | 15 | 20 | 30 | 2 | 5 | 17 | o | 18.2 |
| Example 68 | 2-HEMA 30 | 40 | 20 | 10 | 0.2 | 5 | 18 | o | 19.3 |
| Example 69 | 2-HEMA 20 | 30 | 20 | 30 | 2 | 10 | 16 | o | 18.0 |
| Example 70 | 2-HEMA 20 | 30 | 20 | 30 | 2 | 3 | 22 | o | 19.6 |
| Example 71 | 2-HPMA 20 | 30 | 20 | 30 | 2 | 5 | 21 | o | 19.0 |
| Example 72 | 4-HBA 20 | 30 | 20 | 30 | 2 | 5 | 19 | o | 19.4 |
| Comparative Example 34 | Silica gel as used. | | | | | 5 | 48 | o | 0.7 |
| Comparative Example 35 | Silica gel as used. | | | | | 5 | 55 | o | — |
| Comparative Example 36 | — | 20 | 20 | 60 | 3 | 5 | 26 | o | 19.0 |
| Comparative Example 37 | — | 20 | 20 | 60 | 3 | 5 | 32 | o | — |
| Comparative Example 38 | None | | | | | 0 | 83 | o | 20.7 |
| Comparative Example 39 | None | | | | | 0 | 88 | o | — |
| Comparative Example 40 | 2-HEMA 20 | 30 | 20 | 30 | 7 | 5 | 23 | x | 17.9 |

2-HEMA: 2-Hydroxyethyl methacrylate
2-HPMA: 2-Hydroxypropyl methacrylate
4-HBA: 4-Hydroxybutyl acrylate

TABLE 11

| | Composition of copolymer (B) (parts) | | | | | Blended amount (parts) | 60° Gloss (%) | Izod impact strength (kg · cm/cm$^2$) |
|---|---|---|---|---|---|---|---|---|
| | Hydroxyalkyl (meth)acrylate | Methyl methacrylate | Butyl acrylate | Styrene | Allyl methacrylate | | | |
| Example 73 | 2-HEMA 20 | 30 | 20 | 30 | 2 | 5 | 28 | 24.0 |
| Example 74 | 2-HEMA 5 | 45 | 20 | 30 | 2 | 5 | 31 | 24.3 |
| Example 75 | 2-HEMA 35 | 15 | 20 | 30 | 2 | 5 | 25 | 23.5 |
| Example 76 | 2-HEMA 30 | 40 | 20 | 10 | 0.2 | 5 | 29 | 24.2 |
| Example 77 | 2-HEMA 20 | 30 | 20 | 30 | 2 | 10 | 24 | 23.3 |

TABLE 11-continued

| | Composition of copolymer (B) (parts) | | | | | Blended amount (parts) | 60° Gloss (%) | Izod impact strength (kg · cm/cm²) |
|---|---|---|---|---|---|---|---|---|
| | Hydroxyalkyl (meth)acrylate | | Methyl methacrylate | Butyl acrylate | Styrene | Allyl methacrylate | | | |
| Example 78 | 2-HEMA | 20 | 30 | 20 | 30 | 2 | 3 | 30 | 24.5 |
| Example 79 | 2-HPMA | 20 | 30 | 20 | 30 | 2 | 5 | 27 | 24.3 |
| Example 80 | 4-HBA | 20 | 30 | 20 | 30 | 2 | 5 | 29 | 24.7 |
| Comparative Example 41 | — | | 20 | 20 | 60 | 3 | 5 | 32 | 24.1 |
| Comparative Example 42 | | | None | | | | 0 | 83 | 25.3 |
| Comparative Example 43 | 2-HEMA | 20 | 30 | 20 | 30 | 7 | 5 | 28 | 23.0 |

2-HEMA: 2-Hydroxyethyl methacrylate
2-HPMA: 2-Hydroxypropyl methacrylate
4-HBA: 4-Hydroxybutyl acrylate

We claim:

1. A matting agent, comprising:
   a copolymer (B) prepared by polymerizing a monomer mixture (B-1), comprising:
   i) from 0.5 to 80% by weight of an acrylic acid hydroxyalkyl ester or methacrylic acid hydroxyalkyl ester having an alkyl group of 1 to 8 carbon atoms, or both (b-1),
   ii) from 10–99% by weight of methacrylic acid alkyl ester having an alkyl group of 1 to 13 carbon atoms (b-2), and
   iii) from 0.25 to 5% by weight, per 100 parts by weight of the total amount of the monomer mixture (B-1), of a copolymerizable cross-linking monomer having 2 or more double bonds in the molecule (B-2),
   wherein said copolymer has a particle size of about 40–250 µm.

2. The matting agent of claim 1, which further comprises up to 79% by weight of an acrylic acid alkyl ester having an alkyl group of 1 to 8 carbon atoms (b-3).

3. The matting agent of claim 1, which further comprises up to 70% by weight of a vinyl aromatic monomer (b-4).

4. The matting agent of claim 1, which further comprises up to 20% by weight of another monoethylenically unsaturated monomer.

5. The matting agent of claim 1, wherein said acrylic acid hydroxyalkyl ester is selected from the group consisting of 2-hydroxyethyl acrylate and 4-hydroxybutyl acrylate.

6. The matting agent of claim 1, wherein said methacrylic acid hydroxyalkyl ester is selected from the group consisting of 2-hydroxyethyl methacrylate, 2-hydroxypropyl methacrylate and 2,3-dihydroxypropyl methacrylate.

7. The matting agent of claim 1, wherein said methacrylic acid alkyl ester is selected from the group consisting of methyl methacrylate, ethyl methacrylate and butyl methacrylate.

8. The matting agent of claim 1, wherein said copolymerizable cross-linking monomer is selected from the group consisting of allyl methacrylate, triallyl cyanurate, triallyl isocyanurate, ethylene glycol dimethacrylate, propylene glycol diallyl ether and divinyl benzene.

* * * * *